(12) United States Patent
Rosamond, III et al.

(10) Patent No.: US 11,260,570 B2
(45) Date of Patent: Mar. 1, 2022

(54) FILTRATION APPARATUSES AND SCREEN CHANGER DEVICES FOR POLYMER PROCESSING AND RELATED METHODS

(71) Applicant: PSI-Polymer Systems, Inc., Conover, NC (US)

(72) Inventors: James E. Rosamond, III, Conover, NC (US); David C. Woodcock, Newton, NC (US)

(73) Assignee: PSI-Polymer Systems, Inc., Conover, NC (US)

( * ) Notice: Subject to any disclaimer, the term of this patent is extended or adjusted under 35 U.S.C. 154(b) by 245 days.

(21) Appl. No.: 16/405,804

(22) Filed: May 7, 2019

(65) Prior Publication Data

US 2019/0337215 A1 Nov. 7, 2019

Related U.S. Application Data

(60) Provisional application No. 62/667,812, filed on May 7, 2018.

(51) Int. Cl.
*B29C 48/691* (2019.01)

(52) U.S. Cl.
CPC ............................. *B29C 48/6912* (2019.02)

(58) Field of Classification Search
None
See application file for complete search history.

(56) References Cited

U.S. PATENT DOCUMENTS

| 1,585,817 | A | * | 5/1926 | Jackson | B01D 33/15 210/411 |
| 2,236,769 | A | * | 4/1941 | Armbruster | B01D 21/0009 210/360.1 |
| 3,503,096 | A | * | 3/1970 | Marianelli | H01L 29/00 210/341 |
| 3,583,453 | A | * | 6/1971 | Upmeier | B29C 48/254 425/186 |
| 3,684,419 | A | * | 8/1972 | Voight | B29C 48/69 425/192 R |
| 3,743,101 | A | * | 7/1973 | Schmidt | B29C 48/6912 210/447 |
| 3,797,665 | A | * | 3/1974 | Paquette | D01D 1/10 210/236 |
| 3,817,377 | A | * | 6/1974 | Piggott | B01D 29/902 210/767 |
| 3,856,277 | A | * | 12/1974 | Tiramani | B29C 48/6912 210/447 |
| 3,856,674 | A | * | 12/1974 | Kalman | B01D 29/608 210/774 |
| 3,856,680 | A | * | 12/1974 | Elmore | B29C 48/6912 210/184 |

(Continued)

OTHER PUBLICATIONS

BritAS Filration Sysytems Brochure, entitled "Discountinuous and Continuous Piston Screen Changers," copyright BritAS Recycling—Anlagen Gmbh Sep. 2019.

*Primary Examiner* — Robert J Popovics
(74) *Attorney, Agent, or Firm* — Michael Best & Friedrich LLP

(57) ABSTRACT

Filtration apparatuses and screen changer devices for filtering polymeric material as well as spacer plates, and face plates for the screen changer devices and related methods are shown and described herein.

22 Claims, 12 Drawing Sheets

(56) References Cited

U.S. PATENT DOCUMENTS

| | | | | |
|---|---|---|---|---|
| 3,962,092 A * | 6/1976 | Newman, Jr. | B01D 29/05 | 210/236 |
| 4,025,434 A * | 5/1977 | Mladota | B01D 29/01 | 210/236 |
| 4,080,297 A * | 3/1978 | Yoshida | B01D 29/09 | 210/387 |
| 4,082,487 A * | 4/1978 | Rapp | B29C 48/6912 | 425/135 |
| 4,159,953 A * | 7/1979 | Paquette | B01D 29/09 | 210/396 |
| 4,167,384 A * | 9/1979 | Shirato | B29C 48/6912 | 425/183 |
| 4,202,659 A * | 5/1980 | Kinoshita | B29C 48/691 | 425/183 |
| 4,237,014 A * | 12/1980 | Trott | B29C 48/07 | 210/330 |
| 4,257,901 A * | 3/1981 | Rapp | B29C 48/693 | 210/791 |
| 4,358,262 A * | 11/1982 | Herbert | B29C 48/693 | 425/185 |
| 4,359,387 A * | 11/1982 | Trott | B01D 29/01 | 210/352 |
| 4,395,212 A * | 7/1983 | Lambertus | B29B 7/488 | 425/185 |
| 4,416,605 A * | 11/1983 | Konno | B29C 48/345 | 425/185 |
| 4,468,322 A * | 8/1984 | Fogarty, Jr. | B29C 48/6912 | 210/236 |
| 4,486,304 A * | 12/1984 | Neuman | B01D 29/055 | 210/107 |
| 4,597,870 A * | 7/1986 | Lambertus | B01D 29/925 | 210/341 |
| 4,752,386 A * | 6/1988 | Schulz | B01D 29/01 | 210/108 |
| 4,755,290 A * | 7/1988 | Neuman | B01D 29/055 | 210/138 |
| 4,814,186 A * | 3/1989 | Trott | B01D 29/05 | 425/199 |
| 4,849,103 A * | 7/1989 | Schmidt | B01D 29/925 | 210/323.2 |
| 5,090,887 A * | 2/1992 | Gneuss | B01D 29/01 | 425/185 |
| 5,122,286 A * | 6/1992 | Kreyenborg | B01D 29/668 | 210/791 |
| 5,141,631 A * | 8/1992 | Whitman | B01D 29/05 | 210/108 |
| 5,200,077 A * | 4/1993 | McNeice | B01D 29/15 | 210/323.2 |
| 5,417,866 A * | 5/1995 | Trott | B29C 48/6912 | 210/791 |
| 5,484,539 A * | 1/1996 | Tersi | B01D 29/114 | 210/774 |
| 5,507,498 A * | 4/1996 | Trott | B01D 29/05 | 277/300 |
| 5,578,206 A * | 11/1996 | Ogoshi | B01D 29/01 | 210/236 |
| 5,603,828 A * | 2/1997 | Ishida | B29C 48/6912 | 210/239 |
| 5,658,459 A * | 8/1997 | Guttormsen | B01D 24/14 | 210/279 |
| 5,833,848 A * | 11/1998 | Tominari | B01D 29/846 | 210/232 |
| 5,840,197 A * | 11/1998 | Ishida | B29C 48/6912 | 210/780 |
| 6,149,807 A * | 11/2000 | Previero | B01D 29/096 | 210/236 |
| 6,153,093 A * | 11/2000 | Bentivoglio | B29C 48/2554 | 210/108 |
| 6,196,820 B1 * | 3/2001 | Straka | B29C 45/1753 | 210/184 |
| 6,216,880 B1 * | 4/2001 | Previero | B01D 29/096 | 210/359 |
| 6,261,079 B1 * | 7/2001 | Ishida | B01D 29/52 | 425/197 |
| 6,325,922 B1 * | 12/2001 | Schaller | B29B 13/10 | 210/90 |
| RE37,681 E * | 4/2002 | Yoshii | B29C 48/6912 | 425/185 |
| 6,533,934 B1 * | 3/2003 | Trendelkamp | B29C 48/6912 | 210/236 |
| 6,550,497 B2 * | 4/2003 | Thiele | F16K 3/08 | 137/625.46 |
| 7,147,774 B2 * | 12/2006 | Jones, III | B01D 29/03 | 210/236 |
| 7,419,592 B2 | 9/2008 | Middler et al. | | |
| 8,017,010 B2 * | 9/2011 | Woestmann | B29C 48/6912 | 210/333.01 |
| 9,090,002 B2 * | 7/2015 | Trott | F16J 15/164 | |
| 10,265,649 B2 * | 4/2019 | Ettlinger | B01D 29/94 | |
| 10,307,953 B2 * | 6/2019 | Panebianco | B29C 48/692 | |
| 10,807,295 B2 * | 10/2020 | Kastner | B29C 48/693 | |
| 10,828,820 B2 * | 11/2020 | Woodcock | B29C 48/2562 | |
| 10,933,357 B2 * | 3/2021 | Kastner | B29C 48/692 | |
| 11,103,812 B2 * | 8/2021 | Canaia | B29C 48/693 | |
| 2004/0200784 A1 * | 10/2004 | Jones, III | B01D 29/96 | 210/767 |
| 2009/0053114 A1 * | 2/2009 | Kampf | B01J 19/1887 | 422/135 |
| 2010/0006492 A1 * | 1/2010 | Schulz | B29C 48/70 | 210/225 |
| 2013/0087975 A1 * | 4/2013 | Trott | F16J 15/164 | 277/308 |
| 2013/0126410 A1 * | 5/2013 | Arita | B01D 29/15 | 210/232 |
| 2014/0224749 A1 * | 8/2014 | Hopkins | B29C 48/693 | 210/791 |
| 2014/0305853 A1 * | 10/2014 | Panebianco | B29C 48/2725 | 210/97 |
| 2015/0048016 A1 * | 2/2015 | Hartmann | B29B 13/10 | 210/232 |
| 2016/0136546 A1 * | 5/2016 | Ettlinger | B29C 48/69 | 210/791 |
| 2016/0317953 A1 * | 11/2016 | Canaia | B29C 48/693 | |
| 2018/0065288 A1 * | 3/2018 | Kastner | B29C 48/692 | |
| 2018/0104625 A1 * | 4/2018 | Kastner | B29C 48/256 | |
| 2018/0345561 A1 * | 12/2018 | Woodcock | B29C 48/2545 | |
| 2019/0337215 A1 * | 11/2019 | Rosamond, III | B29C 48/693 | |
| 2020/0262125 A1 * | 8/2020 | Rosamond, III | B29C 48/255 | |
| 2020/0392957 A1 * | 12/2020 | Woodcock | F04C 2/18 | |
| 2021/0162324 A1 * | 6/2021 | Kastner | B01D 33/503 | |

\* cited by examiner

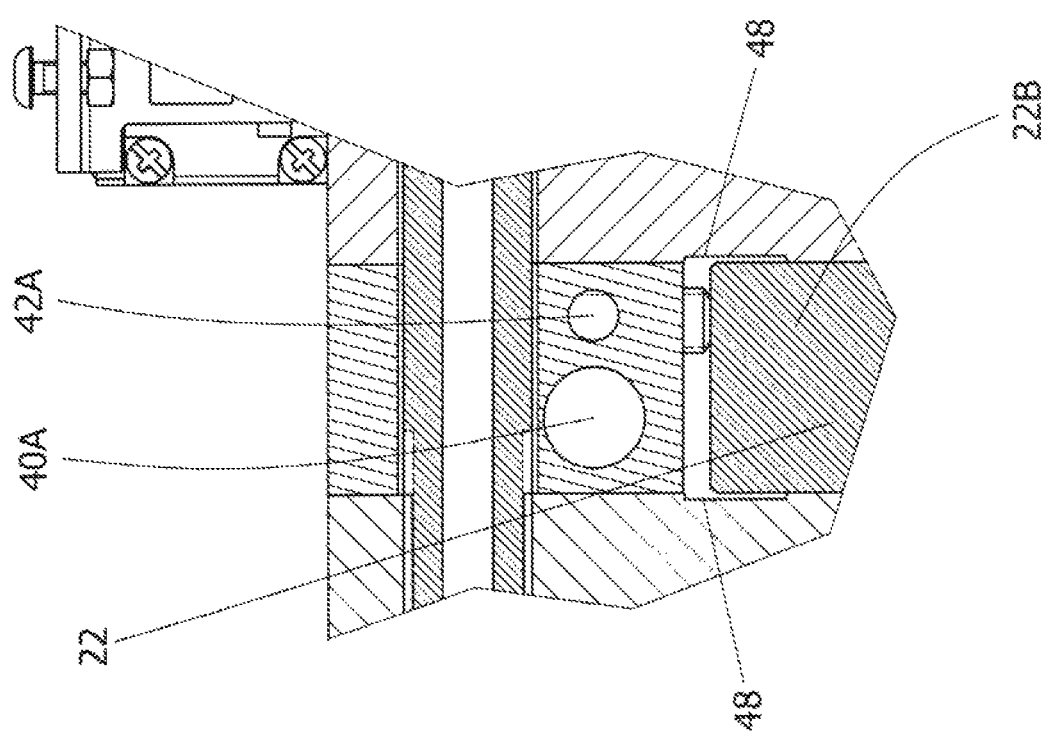

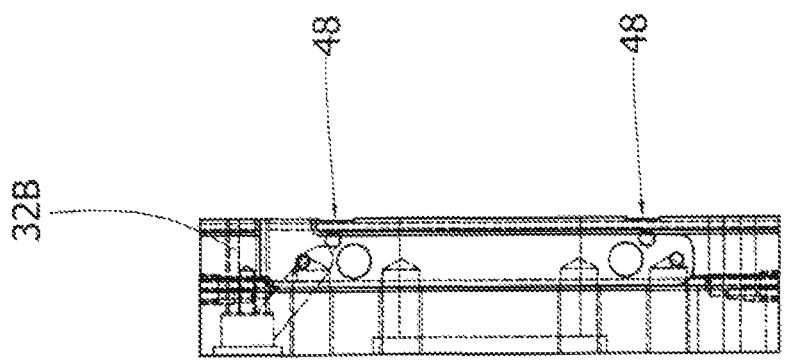

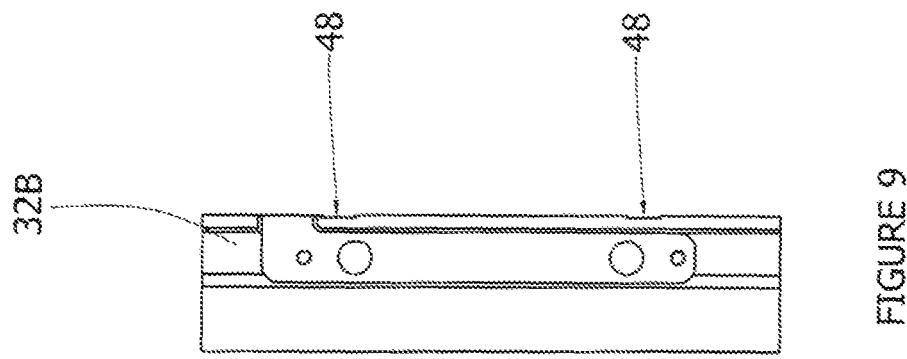

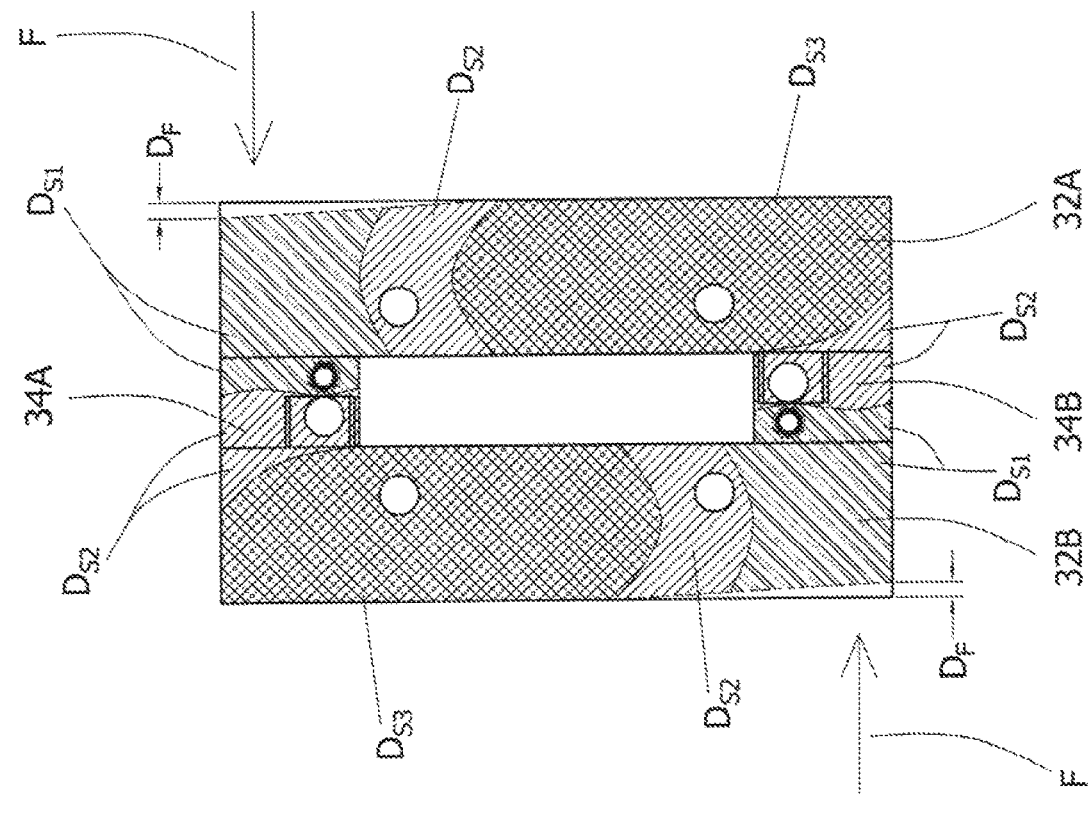

FILTRATION APPARATUSES AND SCREEN CHANGER DEVICES FOR POLYMER PROCESSING AND RELATED METHODS

RELATED APPLICATION

The presently disclosed subject matter claims the benefit of U.S. Provisional Patent Application Ser. No. 62/667,812, filed May 7, 2018, the disclosure of which is incorporated herein by reference in its entirety.

TECHNICAL FIELD

The present invention generally relates to filtration apparatuses and screen changer devices used for filtering of a flowable material such as molten polymer. More specifically, the present invention relates to filtration apparatuses and screen changer devices and the movement and sealing of slide plates within the screen changer devices to prevent leakage and degradation of the material flowing within the filtration apparatuses and screen changer devices.

BACKGROUND

Polymer extrusion systems are well known and used for applications such as the manufacture of extruded polymer components, in a typical application, polymer feedstock particles are combined and heated in an extruder device to produce a stream of molten polymer. The polymer extrudate is then driven under pressure to an appropriate downstream module. As one example, the polymer extrudate can be fed to a die to shape the polymer into a sheet, tube or other desired profile. In a typical polymer processing system, a filtration apparatus is placed in-line between the extruder and the downstream module to filter the polymer extrudate and thereby improve its quality and uniformity. Typically, the filtration apparatus includes screen housing bores with two breaker plates that contain screens as filter elements. The filtration apparatus typically includes an internal bore through which the polymer material flows, and a screen changer device that is movable across the bore to position one breaker plate and screen housing bore in-line with the polymer flow while the other breaker plate and screen housing bore is offline and thus accessible for cleaning or replacement.

The screen changer device thus necessarily interacts with the in-line bore of the filtration apparatus. Moreover, the screen changer device is typically designed to perform a screen changing task during the operation of the processing system, and hence while polymer melt continues to flow through the filtration apparatus. Accordingly, it is important that the filtration apparatus be equipped with a suitable means for sealing the filtration apparatus against the loss of polymer material from the bore. In particular, internal areas of the filtration apparatus present the opportunity for polymer material to "hang-up" and stagnate which can cause the stagnated polymer material to degrade and/or burn, thereby reducing the quality and uniformity of the polymer material being processed.

Filtration apparatuses in the past have offered various sealing approaches. Some screen changer devices have different types of upstream seal rings that are adjustably compressed by screws or springs oriented transversely to the direction of polymer flow. Some of these designs require the use of tools to adjust several screws, and the screws are of a nonstandard customized design that adds costs to the filtration apparatus. Further, for some polymers, such as polyvinyl chloride (PVC), particularly rigid or semi-rigid PVC, the upstream seals whether using screws or springs cannot prevent the polymers from leaking to the point that once the polymer leaks into seams within the filtration apparatus, the degraded polymer causes the slide plate to freeze up in the filtration apparatus so that it is immoveable. Thus, to change filters, the filtration apparatus has to be taken apart and cleaned, which can take hours.

It is widely accepted among persons skilled in the art that, despite past efforts, an ongoing need exists to provide filtration apparatuses of the screen-changing type with improved sealing arrangements and methods for certain types of flowable material, such as molten polymers or the like.

SUMMARY

The present invention generally relates to the filtering of a flowable material such as molten polymer, with a screen changer device that does not employ a seal between the body and slide plate. More specifically, the present invention relates to screen changer devices that include spacers between the face plates of the screen changer device that can expand to allow the slide plate to slide between the face plates to move the slide plate.

Thus, it is an object of the presently disclosed subject matter to provide filter apparatuses and screen changer devices for filtering of a flowable material such as molten polymer as well as methods related thereto that can facilitate the changing of screens within the filter apparatuses and screen changer devices. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 5A illustrates a magnified portion of the vertical cross-sectional view of the flow bore body and the slide plate of the screen changer device according to FIG. 5 more clearly showing embodiments of relief channels in the front and back face plates of the screen changer device;

FIG. 8 illustrates a side plan view of the front face plate of the screen changer device according to FIG. 7;

FIG. 9 illustrates a side plan view of the front face plate of the screen changer device according to FIG. 7, and FIG. 10 illustrates a side plan view of an embodiment of a flow bore body of a screen changer device showing single-sided acting forces F shown for deflection clarity that demonstrates a stress profile that shows exaggerated effects of the stresses placed on embodiments of face plates and spacer plates within the flow bore body upon the fully tightening of embodiments of screws that secure the flow bore body together according to the present subject matter.

Figure 1:
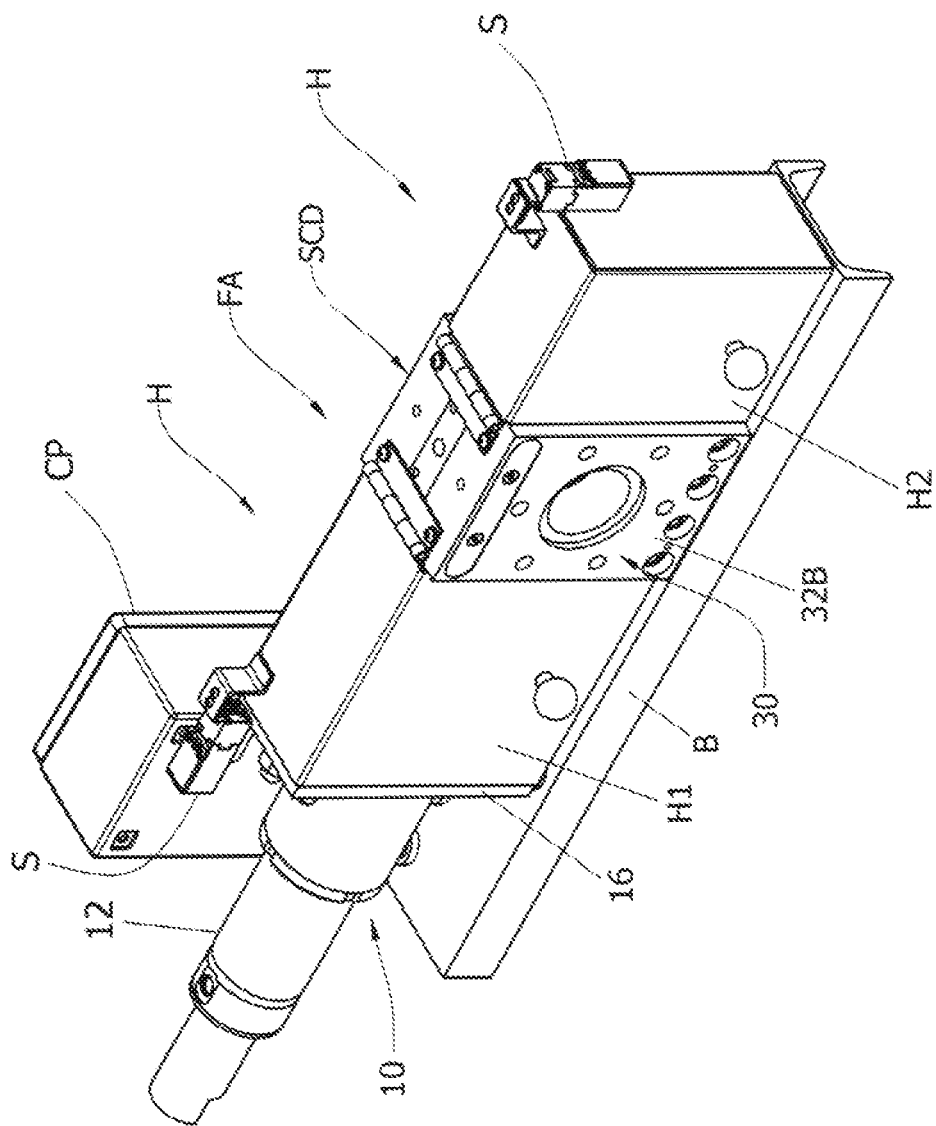
FIG. 1 illustrates a perspective view of an embodiment of filtration apparatus for use in processing polymers according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to t e viewer.

Embodiments of the subject matter of the disclosure are described herein with reference to schematic illustrations of embodiments that may be idealized. As such, variations frog the shapes and/or positions of features, elements or components within the illustrations a result of, for example but not limited to, user preferences, manufacturing techniques and/or tolerances are expected. Shapes, sizes and/or positions: of features, elements or components illustrated in the figures may also be magnified, minimized, exaggerated, lifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be and understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 6, up to 3, and up to about 4.5, as well as ranges within the limit, such as from about 1 to about 5, and from about 3.2 to about 6.5.

The term "normal processing operations" as used herein in conjunction with filtration apparatuses generally means the state of operation at which a screen changer device of a filtration apparatus is processing a fluid, such as molten polymer, such that a flow bore body around flow bores of the screen changer device as described herein are heated to an operating temperature associated with the fluid being processed. During such normal processing operations, top a Id bottom spacer plates and/or screws may be heated in some situations to between an ambient temperature within the environment in which the screen changer device is operating and the operating temperature associated with the fluid being processed. In some situations, top and bottom spacer plates and/or screws may not be heated during such nom al processing operations.

The term "screen changing operations" as used herein n conjunction with filtration apparatus generally means the state of operation at which a screen changer device of a filtration apparatus as described herein is preparing for and moving a slide plate of the screen changer device from a first position where a first screen is aligned with flow bores within a flow bore body of the screen changer device to a second position where a second screen is aligned with the flow bores within the flow bore body of the screen changer device, or vice versa. During such screen changing operations, top and bottom spacer plates and/or screws may be heated to temperatures above the operating temperature associated with the fluid being processed during normal processing operations.

The term "chambers" is used herein can mean a cavity with walls and can include, but is not limited to through bores, or channels, that extend through a plate or body, bores that do not extend all the way through a body or plate, having an end wall, or a cavity having two or more walls.

Referring to FIGS. 1-6, a filtration apparatus, generally designated FA, illustrated according to one exemplary embodiment. In general, filtration apparatus FA can be employed in one or more types of polymer processing systems in which filtration of a stream of heated polymer melt or extrudate is desired. As one typical yet non-limiting example of a polymer processing application generally known to persons skilled in the art pelletized or granulated polymer feedstock is loaded into a hopper (not shown) from which the feedstock is delivered to an extrude shown). The extruder typically includes a motor-powered auger or screw and a means for heating and melting the feedstock to form a flowable polymer melt. The polymer melt exits the extruder a flows toward filtration apparatus FA. A suitable polymer pressurizing and transport means such as a motor-powered gear pump (not shown) can be provided to assist in driving and pressurizing the polymer melt. Depending on the application, such a gear pump if used can be installed either upstream or downstream from filtration apparatus FA. While the heated, pressurized polymer melt flows through filtration apparatus FA, filtration apparatus FA prevents hardened or agglomerated polymeric material, or other undesirable constituents, from passing to the downstream side. From filtration apparatus FA the filtered, polymer melt is flowed to any suitable downstream device or site, one example being a die (not shown) from which polymeric sheets, tubes, or other profiles can be extruded. The flow of polymeric material occurs in an in-line flow direction.

Figure 2:
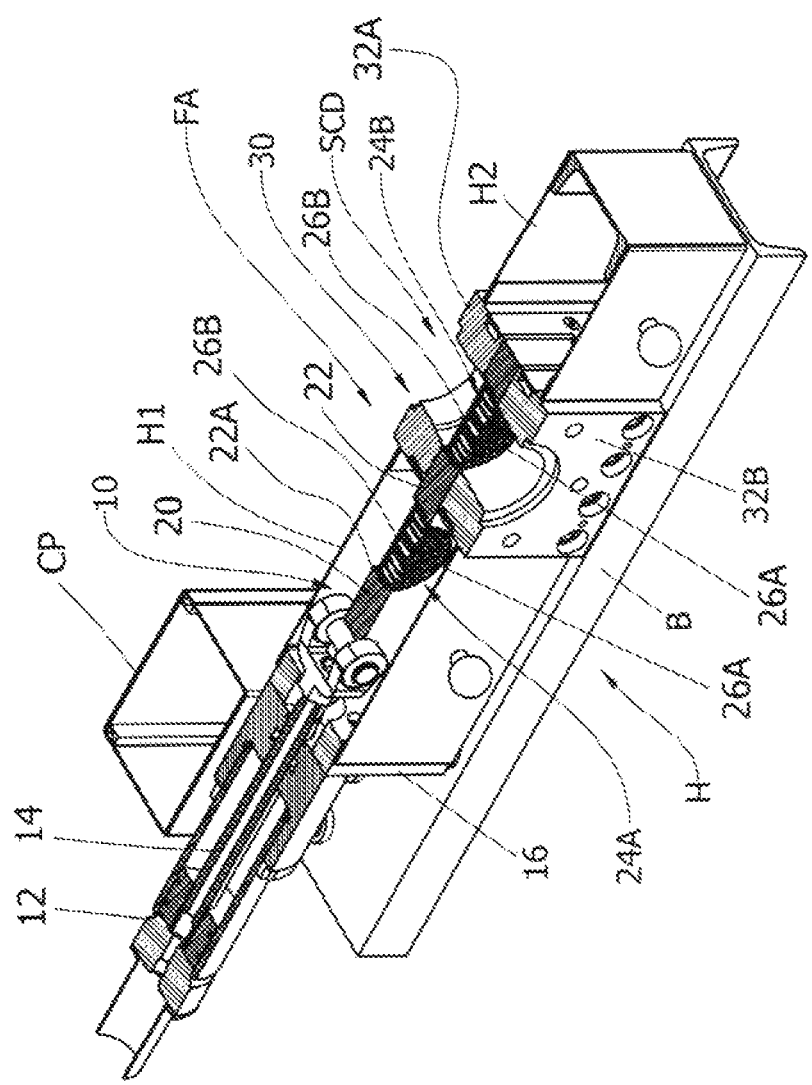
FIG. 2 illustrates a horizontal partial cross-sectional perspective view of filtration apparatus according to FIG. 1.
Figure 3:
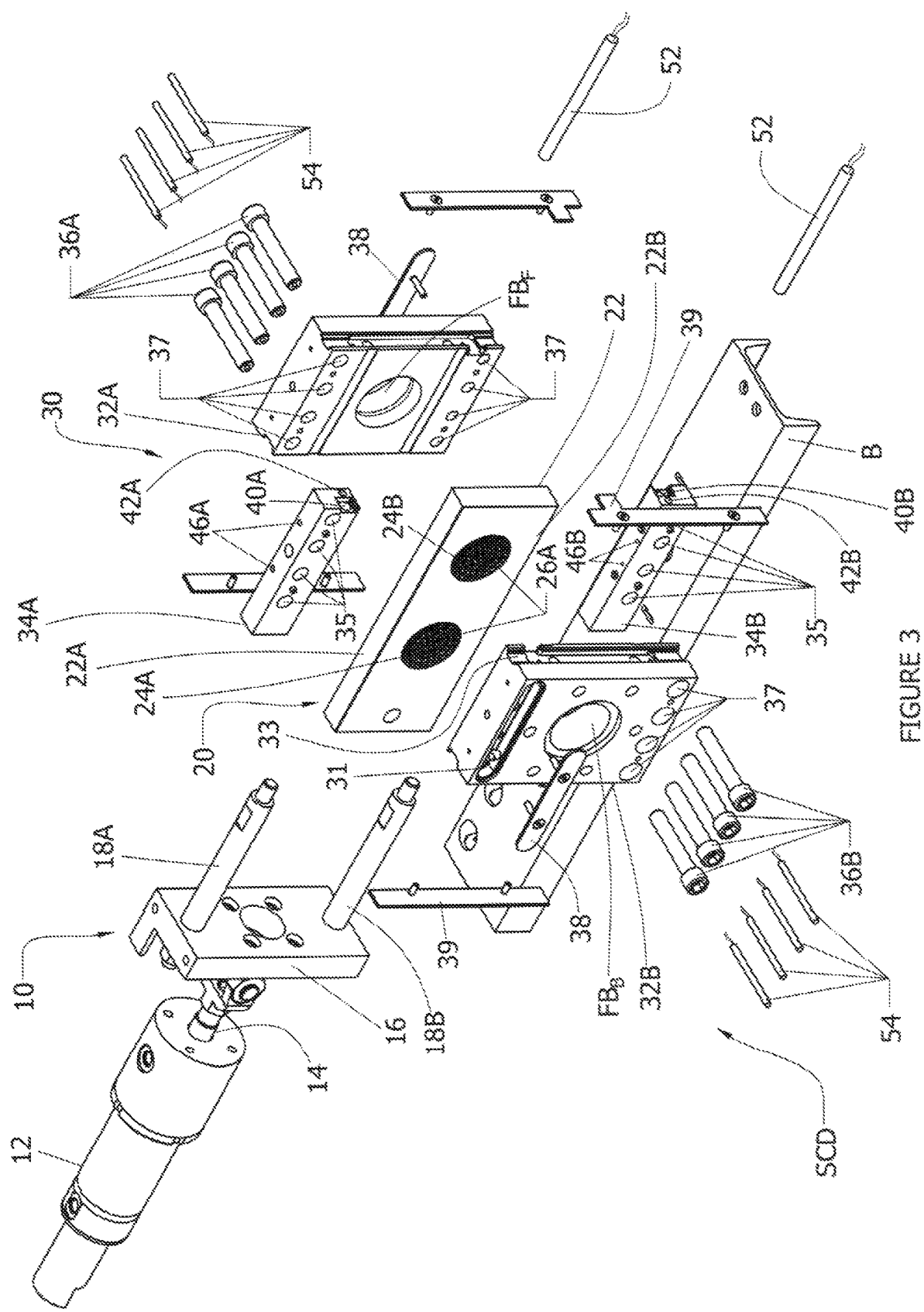
FIG. 3 illustrates an exploded perspective view of an embodiment of a screen changer device of the filtration apparatus device according to FIG. 1.
Figure 4:
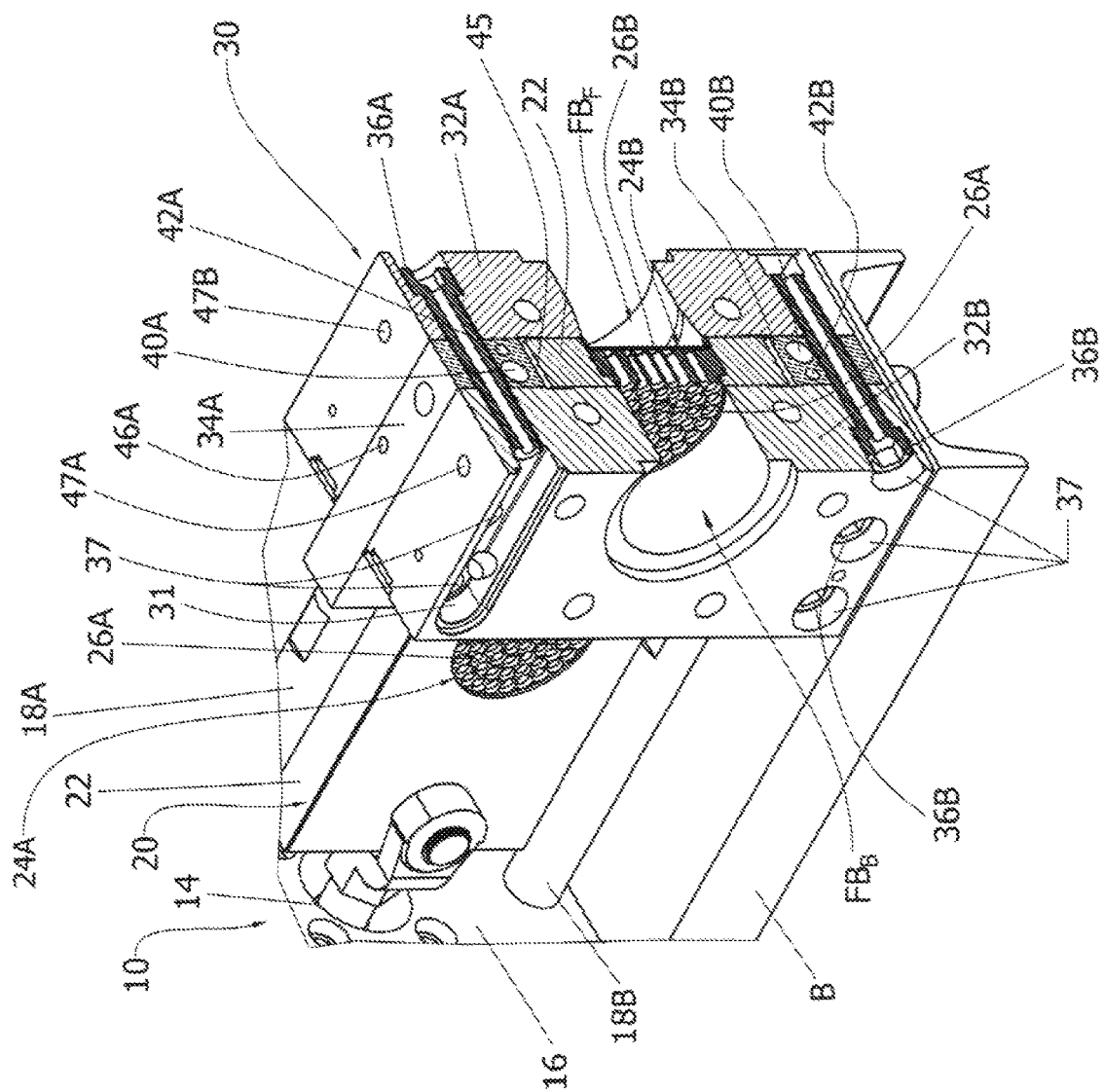
FIG. 4 illustrates a vertical partial cross-sectional perspective view of an embodiment of a screen changer device of the filtration apparatus device according to FIG. 1 with the cross-section taken through embodiments of a flow bore body and a slide plate according to the present subject matter.

As shorn in FIGS. 1-6, fluid filtration apparatus FA is provided that can generally comprise a housing, generally designated H, a screen changer device, generally designated SCD and a controller, or control panel, CP As show in FIGS. 1 and 2, the housing H generally can include one or more enclosing structures such as one or more guard structures $H_1$ and $H_2$ and a base B to which the screen changer device SCD can be secured. The controller CP that can comprise one or more computers, programmable logic controllers, mini-computers, data processing devices, or the like, in a manner known in the art. The controller CP can be in communication with a comprehensive control system for the entire polymer processing line. The guard structures $H_1$ and $H_2$ can have safety switches S that are in communication with the controller CP that can stop operation of the filtration apparatus FA when the safety switches are activated. Alternatively, in some embodiments, the components of the filtration apparatus FA can be in direct communication with and can be controlled by and/or through the control system for the entire polymer processing line.

Referring to FIGS. 1-6, the screen changer device SCD can comprise a slide plate assembly 10 and a flow bore body 30 comprising of multiple parts. The slide plate assembly 10 can comprise a hydraulic cylinder 12 with an extension arm 14 that is secured to a slide plate 20 at one end. The slide plate assembly 10 can also comprises a cylinder mounting plate, or mounting plate, 16 to which the hydraulic cylinder 12 can be secured and tie rods 18A, 18B that position and hold the mounting plate 16 relative to the flow bore body 30. The slide plate 20 can also comprise an elongate body 22 that can comprise a first section 22A and a second section 22B. A first screen housing bore 24A can extend through the first section 22A of the elongate body 22 and a second screen housing bore 24B can extend through the second section 22B of the elongate body 22 to hold screens.

In particular, each of the first and second screen housing bores 24A, 24B can hold a breaker plate 26A and a filter element, or screen, 26B that is used to filter polymeric material that flows through the filtration apparatus FA when the first screen housing bore 24A or second screen housing bore 24B are aligned with a flow bore in the body 30. The breaker plate 26A acts as a support for the screen 26B. The breaker plate 26A has larger or wider diameter apertures there through than the porous material of the screen 26B. The screen 26B as used herein is generic and can include but is not limited to screen packs having a mesh configuration. Example of different mesh configurations can include, but are not limited to, 20/80/20, 20/40/100/40/20, 50/80/150/80/50 or the like. The screens 26B can be removed for cleaning and/or replacement as is required to maintain proper filtration of the polymeric material be processed. Thereby, the screens 26B can be exchanged. Similarly, as needed, the breaker plates 26A can be also be removed from the first or second screen housing bores 24A, 24B to be cleaned if the breaker plates 26A become dirty, clogged, or damaged. Thus, the breaker plates 26A can be cleaned and placed back in the first and second screen housing bores 24A, 24B or can be replaced with a new breaker plates 26A. Thus, the breaker plates 26A are also exchangeable as needed.

The hydraulic cylinder 12 can extend or retract the slide plate 20 to properly align the first screen housing bore 24A or the second screen housing bore 24B depending on which one is to be aligned with the flow bore within the flow bore body 30. The extension arm 14 of the hydraulic cylinder 12, the mounting plate 16 and the tie rods 18A and 18B all help control the amount of extension and retraction of the slide plate 20 to ensure proper alignment.

The flow bore body 30 of the screen changer device SCD can comprise a front face plate 32A and a back face plate 32B. The front face plate 32A and the back face plate 32B include respective flow bores $FB_F$ and $FB_B$ that align with each other and the flow bores of upstream portions and downstream portions of the polymer processing line. The flow bore body 30 of the screen changer device SCD can also comprise a top spacer plate 34A and a bottom spacer plate 34B that are positioned between a top portion of the two face plates 32A, 32B and a bottom portion of the two face plates 32A, 32B to form a slide plate chamber 45 in which the slide plate 20 resides and can slide during screen changing operations to align one of the respective first and second screen housing bores 24A, 24B with screens 26 therein with the respective flow bores $FB_F$ and $FB_B$ of the front face plate 32A and the back face plate 32B. The front face plate 32A and the back face plate 32B and the top spacer plate 34A and the bottom spacer plate 34B can be held tightly together with sets of top screws 36A and bottom screws 36B.

The front face plate 32A and the back face plate 32B and top spacer plate 34A and a bottom spacer plate 34B are machined and/or milled to such tolerances that during normal processing operations of the filtration apparatus FA when one of the first and second screen housing bores 24A, 24B is aligned with the respective flow bores $FB_F$ and $FB_B$ of the front face plate 32A and the back face plate 32B and polymer is flowing therethrough, the slide plate 20 is so tightly held within the chamber that it is not movable and provides no perceivable seams between the flow bore body 30 and the slide plate 20 into which molten polymer being processed can flow. With such tight tolerances, the slide plate 20 is provided space within the chamber for movement of the slide plate 20 for screen changing during screen changing operations by heating the top spacer plate 34A and the bottom spacer plate 34B to a high temperature which causes the top spacer plate 34A and a bottom spacer plate 34B to expand to temporarily widen the slide plate chamber 45 to allow the hydraulic cylinder 12 to move the slide plate 20 within the chamber formed by the front and back face plates 32A, 32B and the top and bottom spacer plates 34A, 34B.

The top spacer plate 34A can have a heating element chamber or channel, 40A and the bottom spacer plate 34B can have a heating element chamber, or channel, 40B that can each house a heating element 52 (see FIG. 3) that can heat the top and bottom spacer plates 34A, 34B to a temperature that will cause the top and bottom spacer plates 34A, 34B to expand to temporarily widen the slide plate chamber 45 during screen changing operations. In some embodiments as shown, the heating element chambers 40A, 40B can extend along a length of the top and bottom spacer plates 34A, 34B transverse to the flow bore direction. The top spacer plate 34A can also have a cooling element chamber 42A and the bottom spacer plate 34B can have a cooling element chamber, or channel, 42B that can each house a cooling element or permit circulation of a cooling fluid to regulate the temperature of the top and bottom spacer plates 34A, 34B and/or to cool the top and bottom spacer plates 34A, 34B when a heating element 52 has been used to create space within the slide plate chamber 45 of the flow bore body 30 to allow the slide plate 20 to be moved to a different position and the top and bottom spacer plates 34A, 34B are being cooled down to an operating temperature that permits the tightening of the chamber of the flow bore body 30 on the sides of the slide plate 20. In an alternative embodiment, the heating element chambers, or channels, 40A 40B can be configured to be connect to a heating fluid circulation system, such as for example, heat transfer fluid systems produced and sold by MOKON located in Buffalo, N.Y., to heat the top and bottom spacer plates 34A, 34B Examples of heat transfer oil systems sold by MOKON can include HFT 500 Series, HTF 600 Series, the HTF HF-2 Series, and the HTF ST Series. Other manufacturers make similar heat transfer fluid systems that can be used in conjunction with the filtration apparatuses described herein. In such embodiments, the fluid pumped through the heating element chambers 40A, 40B can be used to heat and cool the top and bottom spacer plates 34A, 34B as needed to reach desired temperatures and to regulate the temperatures of the top and bottom spacer plates 34A, 34B so that a second cooling element chamber or channel may not be needed.

The top spacer plate 34A can additionally have a temperature gauge chamber 46A and the bottom spacer plate 34B can have a temperature gauge chamber 46B that can each house a temperature gauge, such as a thermometer, that can be in communication with the control panel CP to provide feedback on the temperature of the top and bottom spacer plates 34A, 34B. The controller CP can be in operable communication with the eating element 52 and/or the heat control fluid circulation system. In this manner, the controller CP can monitor and control the heating of the top and bottom spacer plates 34A, 34B.

Further, in some embodiments, the top and bottom spacer plates 34A, 34B can have screw bores 35 that can extend through the width of the top and bottom spacer plates 34A, 34B which can be transverse to the heating element chambers 40A, 40B. The screws 36A, 36B can be heated as well to facilitate the expansion of the top and bottom spacer plates 34A, 34B and the temporary widening of the slide plate chamber 45. In particular, the screws 36A, 36B can be heated during screen changing operations to expand the screws 36A, 36B and temporarily relieve torque or loosen the tightness of the screws 36A, 36B to help facilitate the expansion of the top and bottom spacer plates 34A, 34B and outward movement of the upper and lower portions of the front and back face plates 32A, 32B that are being pushed outward by the expanded top and bottom spacer plates 34A, 34B to temporarily widen the slide plate chamber 45. For example, as shown in FIGS. 5 and 6, the screws 36A, 36B can have a chamber therein, or a channel therethrough, for receiving a heating element 54 (see FIG. 3) that can heat the respective screws 36A, 36B to a desired temperature.

In some embodiments, the tolerances of the front and back face plates 32A, 32B and the top and bottom spacer plates 34A, 34B can be within about 0.0001 inches and about 0.0009 inches, for example, about 0.0005 inches so that the chamber size, particularly on the sides of the front and back face plates 32A, 32B create a seal with the slide plate 20 when the top and bottom spacer plates 34A, 34B are contracted. With such tolerances, the slide plate 20 is held tightly with little to no leakage of polymer between the front and back face plates 32A, 32B and the slide plate 20 during normal processing operations. Thereby, no additional seal is needed between the front and back face plates 32A, 32B and the slide plate 20. When it is time to shift the slide plate 20 to change screens 26 during screen changing operations, the top and bottom spacer plates 34A, 34B can be heated up to a temperature that will cause them to expand enough to loosen the contact between the sides of the front and back face plates 32A, 32B and the slide plate 20 so that the hydraulic cylinder 12 can move the slide plate 20 to the different position by either extending or retracting the extension arm 14. For example, the top and bottom spacer plates 34A, 34B can be heated to temperatures between about 500° F. to about 800° F., for instance, about 700° F. This heating can be done quickly and for just long enough for the slide plate 20 to be moved. So, the heat transfer to the front and back face plates 32A, 32B can be minimized and the front and back face plates 32A, 32B will not reach temperatures that will cause the polymer, such as rigid or semi-rigid PVC, to degrade or burn.

Figure 5:
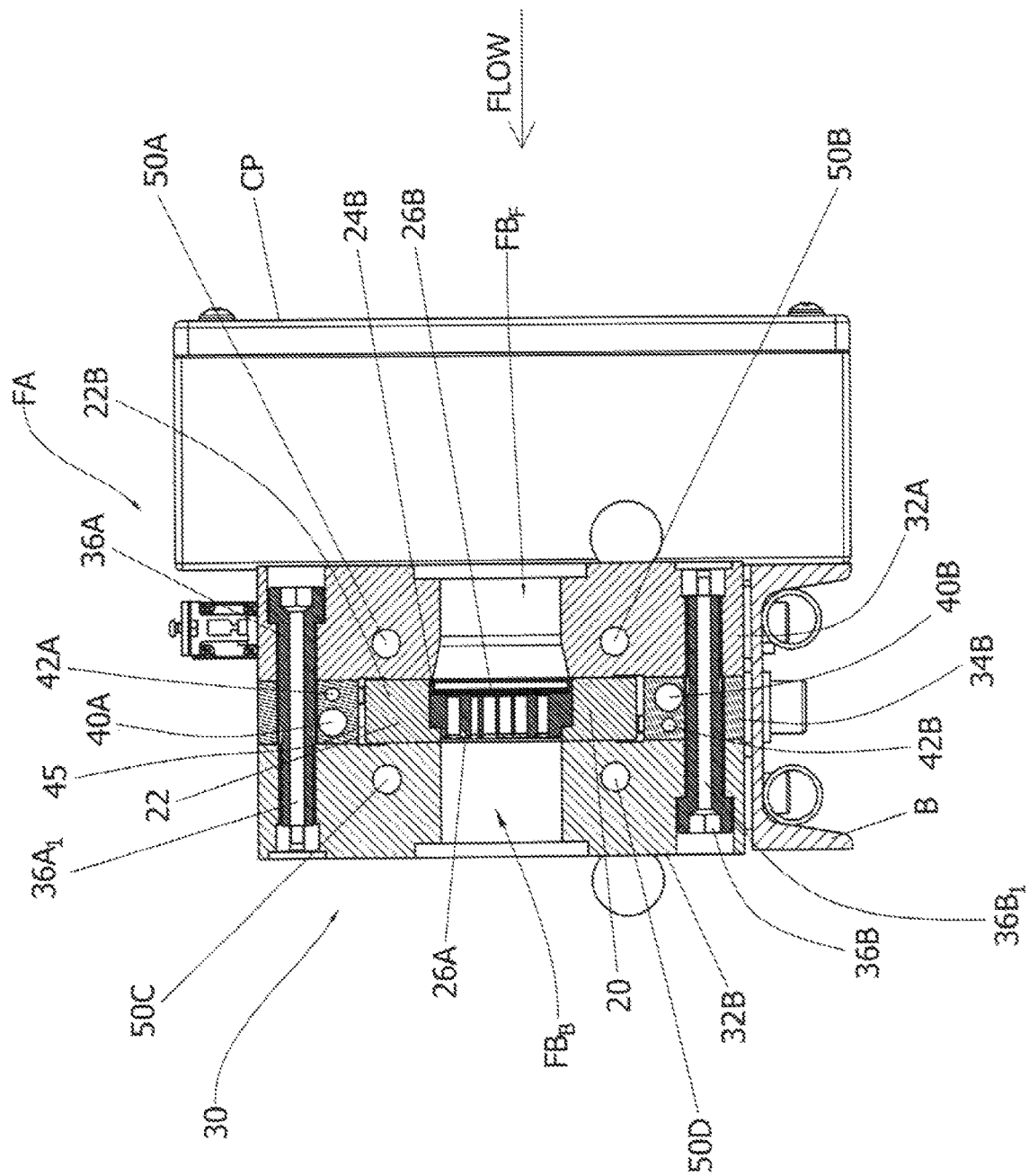
FIG. 5 illustrates a vertical cross-sectional view of the flow bore body and the slide plate of the screen changer device according to FIG. 4.
Figure 6:
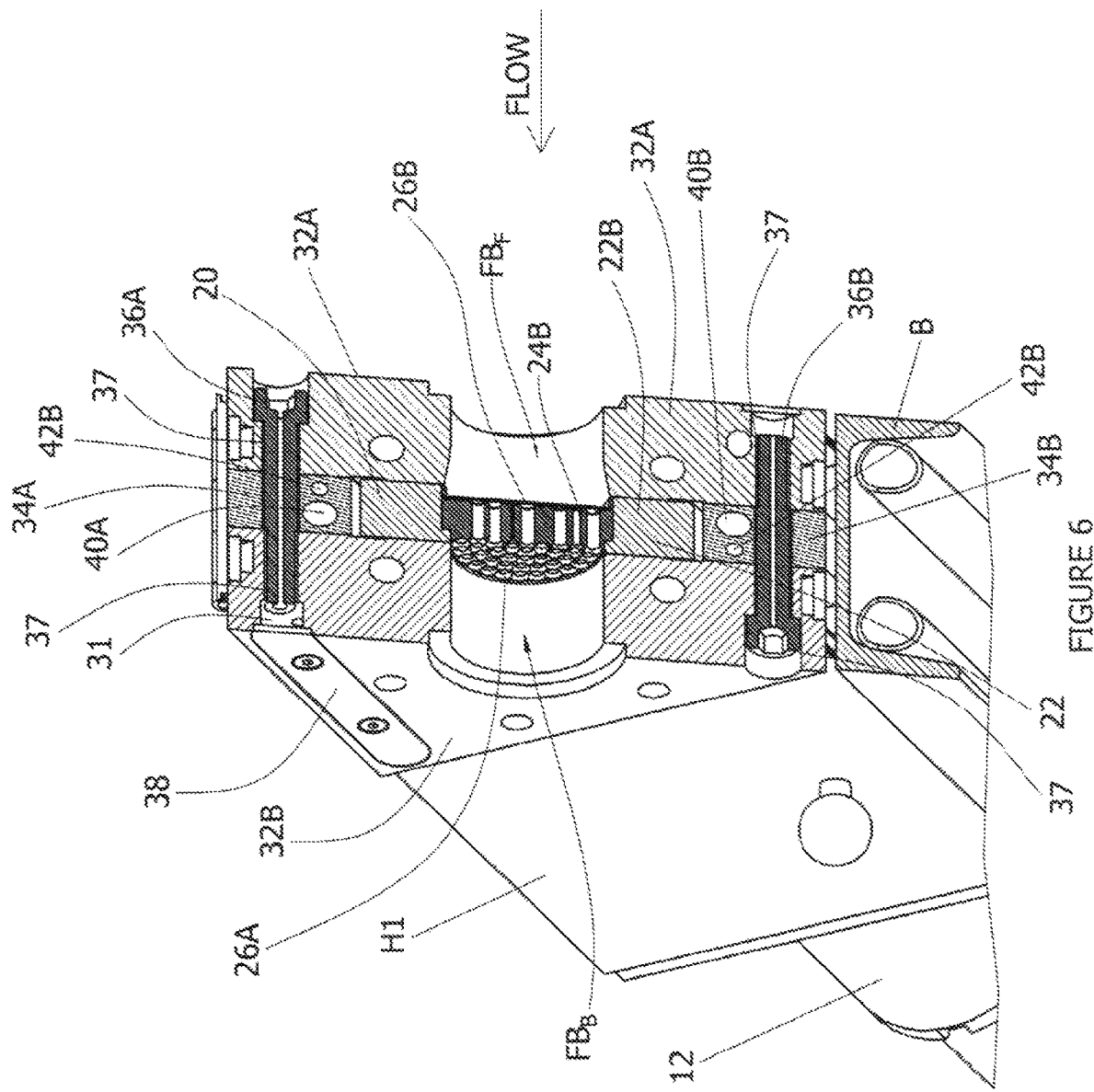
FIG. 6 illustrates a diagonal cross-sectional view of the screen changer device taken through the flow bore body and the slide plate of the screen changer device according to FIG. 4.
Figure 7:
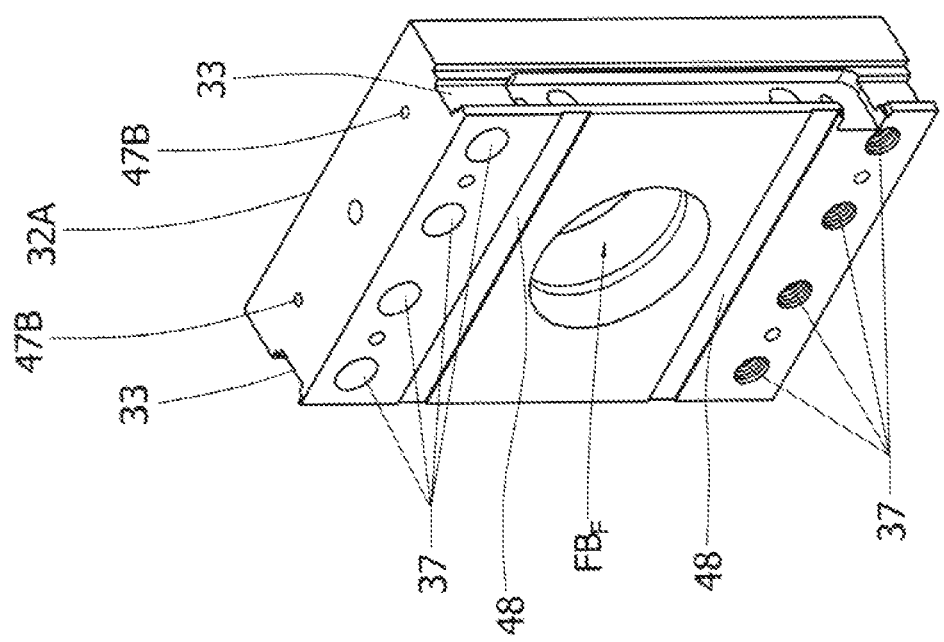
FIG. 7 illustrates a perspective view of an embodiment of a front face plate of an embodiment of the screen changer device according to the present subject matter.
Figure 7A:
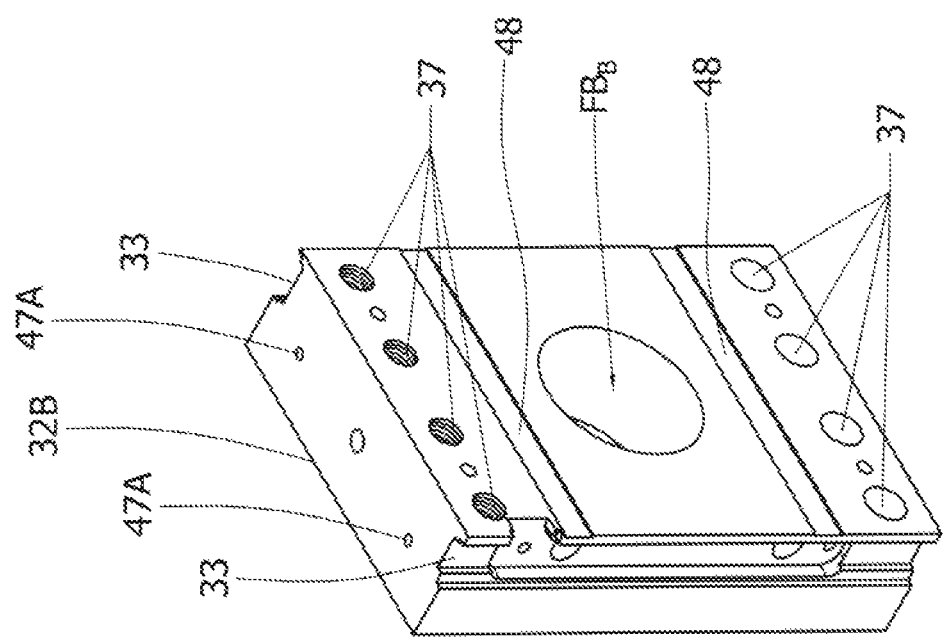
FIG. 7A illustrates a perspective view of an embodiment of a back face plate of an embodiment of the screen changer device according to the present subject matter.

As shown in FIGS. 3, 5, and 7, 7A, 8 and 9, the front and back face plates 32A, 32B can be heated around the flow bores $FB_B$ and $FB_F$ therein to regulate the temperature around the flow bores $FB_B$ and $FB_F$ in the front and back face plates 32A, 32B to facilitate the processing of fluid through the screen changer device SCD. The front and back face plates 32A, 32B can have heating fluid chambers 50A, 50B, 50C 50D as shown in FIG. 5 that allow for the circulation of a heating fluid therethrough to heat and regulate the temperature of the front and back face plates 32A, 32B around the flow bores $FB_B$ and $FB_F$. The temperature within the front and back face plates $FB_B$ and $FB_F$ can be monitored and regulated around the flow bores therein. In particular, the front and back face plates 32A, 32B can include temperature monitoring chambers 47A and 47B that can hold thermometers or other temperature gauges that can be in communication with the controller CP to monitor the heating of the front and back face plates 32A, 32B. This monitoring can make sure that the front and back face plates 32A, 32B stay within operating temperature range, especially around the flow bores $FB_F$ and $FB_B$ to maintain the integrity and desire flow rate/viscosity of the polymer being processed. Each of the front and back face plates 32A, 32B and the top and bottom spacer plates 34A, 34B include screw bores 37 for receiving the set of top screws 36A and the set of bottom screws 36B. Some of these screw bores can be threaded and some can be configured to receive a head of a screw depending on the intended orientation of the screws. Further in some embodiments, the front and back face plates 32A, 32B can include compartments 31, 33 formed therein and covers 38, 39 to house wiring and other components used to heat and/or cool the front and back face plates 32A, 32B and the top and bottom spacer plates 34A, 34B. The front and back face plates 32A, 32B can also comprise chambers or channels or heating/cooling elements or for heating fluid circulation systems.

The front and back face plates 32A, 32B, the slide plate, and the top and bottom spacer plates 34A, 34B can comprise a metal. For example, the front and back face plates 32A, 32B, the slide plate, and the top and bottom spacer plates 34A, 34B can comprise steel. The seal created between the steel on steel contact between the front and back face plates 32A, 32B and the slide plate 20 can prevent leakage enough to allow polymers, such as rigid PVC and semi-rigid PVC to be run through the filtration apparatus FA without causing the slide plate to freeze or seize overtime due to polymer leakage. At the same time, the top and bottom spacer plates 34A, 34B can be quickly heated during a screen change procedure to a temperature that allows the expansion of the top and bottom spacer plates 34A, 34B to push outward on the front and back face plates 32A, 32B to temporarily widen the slide plate chamber 45 and create enough space between the front and back face plates 32A, 32B and slide plate 20 to permit the slide plate 20 to be moved to a different position before cooling the top and bottom spacer plates 34A, 34B allowing them to contract to create the tight steel on steel contact seal between the front and back face plates 32A, 32B and the slide plate 20 at the new position of the slide plate 20. The cooling can occur using one or more cooling elements or fluid cooling systems as described above and/or by turning off the heating elements. In some embodiments, the space created by the heating of the top and bottom spacer plates 34A, 34B to allow the movement of the slide plate 20 can be between a few ten thousandths of inch to a few thousandths of an inch. In some embodiments, for example, the space can be about 0.0005 inches on each side of the slide plate 20.

FIG. 10 shows single-sided acting forces F shown only for deflection clarity to demonstrate how much stress the screws 36A, 36B place on the front and back face plates 32A, and 32B and the spacer plated 34A and 34B. The deflections $D_F$ as shown in FIG. 10 are exaggerated to help communicate that problem of deflection within the front and back face plates 32A and 32B. The screws 36A, 36B when fully tightened creates forces F on the portions of the faceplates 32A and 32B and the spacer plated 34A and 34B where the screws 36A, 36B entered and the heads for the screws 36A, 36B abut against the side of the faceplates 32A, and 32B. Thus, a lower side portion of the front face plate 32A and the corresponding side of the bottom spacer plate 34B are placed under great forces and stress as shown in sections $D_{S1}$ and $D_{S2}$ in FIG. 10 where deflection can range from about 0.00015 to about 0.00030 as compared to the opposing lower portion of the back face plate 32B and the corresponding side of the bottom spacer plate 34B as shown in sections $D_{S3}$ in FIG. 10 where deflection can still be about 0. Similarly, an upper side portion of the back face plate 32B and the corresponding side of the top spacer plate 34A are placed under great forces and stress as shown in sections $D_{S1}$ and $D_{S2}$ in FIG. 10 as compared to the opposing upper portion of the front face plate 32A and the corresponding side of the top spacer plate 34A as shown in sections $D_{S3}$ in FIG. 10 where deflection can still be about 0. These stresses, if not compensated for, can cause a slight bowing of the front and back face plates 32A, 32B around the chamber and create scoring of the slide plate 20 when the slide plate 20 is moved between the sides of the front and back face plates 32A, 32B.

To help maintain the tightness between the metal on metal contact between the slide plate 20 and the front and back face plates 32A, 32B without creating bowing on the interior side of the front and back face plates 32A, 32B and the slide plate 20 at the flow bores $FB_F$ and $FB_B$ when the screws 36A, 36B are fully tightened and potential scoring of the slide plate 20 when the slide plate is moved, relief channels 48 can be formed on the interior sides of the front and back face plates 32A, 32B as shown in FIGS. 5A, 7, 7A, 8, and 9 to provide deflection at critical points between the front and back face plates 32A, 32B and the slide plate 20. Thereby, the metal on metal contact between the front and back face plates 32A, 32B and the slide plate 20 can maintain a seal. In some embodiments, the screws 36A, 36B can be heated to help facilitate the outward movement of the front and back face plates 32A, 32B.

Thus, as disclosed herein, filtration apparatuses and screen changer devices for filtering polymeric material as well as spacer plates and face plates for the screen changer devices and related methods are provided. For example, a fluid filtration apparatus for processing fluid can be provided that comprises a screen changer device that can include a slide plate assembly and a flow bore body. The slide plate assembly can comprise a hydraulic cylinder with an extension arm that extendable and retractable and a slide plate secured to an end of the extension arm. The slide plate can have a first screen housing bore and a second screen housing bore for housing exchangeable screens for filtering of a fluid being processed. The flow bore body can comprise front and back face plates and top and bottom spacer plates. The front face plate can have a front flow bore and the back face plate can have a back flow bore that align with each other and can align with flow bores of upstream process equipment and downstream process equipment of the polymer processing line. The top spacer plate can be positioned between a top portion of the front and back face plates and the bottom spacer plate can be positioned between a bottom portion of the front and back face plates to form a slide plate chamber in which the slide plate slidably resides to align one of the respective first and second screen housing bores with screens therein with the respective flow bores of the front face plate and the back face plate. The top spacer plate and the bottom spacer plate can each comprise a heating element chamber for receiving a heating element. The heating elements when heated causes the top spacer plate and the bottom spacer plate to expand to create enough space within the slide plate chamber to permit the slide plate to be movable within the slide plate chamber and when the top spacer plate and the bottom spacer plate are cooled, the slide plate tightly held in place within the slide pate chamber. Thus, the heating elements when heated causes the top spacer plate and the bottom spacer plate to expand to temporarily widen the slide plate chamber. The fluid filtration apparatus can also comprise a controller that can be in operable communication with the screen changer device that extends and retracts the extension arm of the hydraulic cylinder and a housing that encloses at least a portion of the screen changer device.

In some embodiments, the slide plate assembly of the screen changer device can further comprise a mounting plate to which the hydraulic cylinder can be secured and tie rods secured to the mounting plate and the top and bottom spacer plates so as to position the slide plate relative to the slue plate of the flow bore body. The mounting plate rid the tie rods can aid in the control of the amount of extension and retraction of the slide plate to ensure proper alignment of the respective first and second screen housing bore the slide plate with the front and back flow bores in the respective front and back face plates. As stated above, in some embodiments, the slide plate of the slide plate assembly of the screen changer device can comprise an elongate body that can include a first section and a second section with the first screen housing bore extending through the first section of the elongate body and the second screen housing bore extending through the second section of the elongate body. When the extension arm of the hydraulic cylinder is extended, the first screen housing bore of the slide plate with screen housed therein is aligned with the front and back flow bores in the respective front and back face plates of the flow bore body and the second screen housing bore resides outside the flow bore body to permit the removal of a screen from the second screen housing bore for cleaning or exchange. When the extension arm of the hydraulic cylinder is retracted, the second screen housing bore of the slide plate with a screen housed therein is aligned with the front and back flow bores in the respective front and back face plates of the flow bore body and the first screen housing bore resides outside the flow bore body to permit the removal of a screen from the first screen housing bore for clean ng or exchange.

In some embodiments, the front face plate and the back face plate and the top spacer plate and the bottom spacer plate can be secured tightly together with sets of top screws and bottom screws. The top screws and the bottom screws have screw heating element chambers therein for receiving heating elements. Heating elements stored within the screw heating element chambers can be heated to facilitate the expansion of the top spacer plate and the bottom spacer plate to create enough space within the slide plate chamber to permit the slide plate to be movable within the slide plate chamber. In particular, the heating elements stored within the screw heating element chambers can be heated to heat the screws to relieve torque on the screws to facilitate the expansion of the top spacer plate and the bottom spacer plate to create space within the slide plate chamber to permit the slide plate to be movable within the slide plate chamber.

The front face plate and the back face plate and top spacer plate and a bottom spacer plate are at least one of machined or milled to such tolerances that, during normal processing operations of the filtration apparatus, when one of the first and second screen housing bores is aligned with the respective front and back flow bores of the front face plate and the back face plate and polymer is flowing therethrough, the slide plate is tightly held within the chamber so as to be not movable and provides no perceivable seams between the flow bore body and the slide plate into which molten polymer being processed can flow and no additional seal is needed between the front and back face plates and the slide plate. In such embodiments, the heating elements in the top and bottom spacer plates can be heated to heat the top and bottom spacer plates to expand the top and bottom spacer plates to create enough space within the slide plate chamber for the hydraulic cylinder to move the slide plate within the chamber without damaging the front and back face plates or the slide plate.

In some embodiments, the heating element chambers within the top and bottom spacer plates extend along a length of the top and bottom spacer plates transverse to the flow bore direction within the screen changer device.

In some embodiments, each of the top and bottom spacer plate further comprise a cooling element chamber. In some such embodiments, the cooling element chambers in the top and bottom spacer plates can house a cooling element to regulate the temperature of the top and bottom spacer plates. In some embodiments, the cooling element chambers in the top and bottom spacer plates can permit circulation of a cooling fluid to regulate the temperature of the top and bottom spacer plates. The cooling element chambers in the top and bottom spacer plates can be used to cool the top and bottom spacer plates down to an operating temperature that permits the tightening of the slide plate chamber of the flow bore body against the slide plate.

In some embodiments, the heating element chambers can be configured to be a part of a heating fluid circulation system to heat and cool the top and bottom spacer plates as needed to regulate the temperatures of the top and bottom spacer plates. In some embodiments, each of the top and bottom spacer plate can further comprise temperature gauge chambers for housing temperature gauges. During operation, the top and bottom spacer plates can be heated to temperatures between about 500° F. to about 800° F. The front and back face plates can comprise temperature monitoring chambers for holding temperature gauges. The front and back face plates can also comprise relief channels hit on interior sides of the front and back face plates to prevent or minimize separation between the front and back face plate and the slide plate due to the heating top and bottom spacer plates.

One related method the fluid filtration apparatus can comprise a method of changing a screen within a screen changer device within a fluid processing apparatus. Such a method of changing a screen within a screen changer device within a fluid processing apparatus can comprise heating a top spacer plate that is positioned between a top portion of a front and back face plates of a screen changer device and a bottom spacer plate that positioned between a bottom portion of the front and back face plates causing the top and bottom spacer plates to expand to create space within a slide plate chamber of the screen changer device that is formed by the top and bottom spacer plates and the front and back face plates. A slide plate can be slid within the slide plate chamber from a first position where a first screen housing bore within the slide plate in which a first filter screen resides is aligned with flow bores in the front and back face plates to a second position where a second screen housing bore within the slide plate in which a second filter screen resides is aligned with the flow bores in the front and back face plates. The method can also comprise cooling the top and bottom spacer plates such that the top and bottom spacer plates contract to decrease space within the slide plate chamber to tightly hold the slide plate between the front and back face plates preventing movement of the slide plate within the slide plate chamber. When the slide plate assembly is moved to the second position with the second screen housing bore within the slide plate aligned with the flow bores in the front and back face plates, the first screen housing bore of the slide plate resides outside the front and back face plate to permit access to the first filter screen within the first screen housing bore. Thereby, the first filter screen can be removed from the first screen housing bore of the slide plate and a clean filter screen can be pieced the first screen housing hare of the slide plate.

Similarly in this method, the top and bottom spacer plates can be heated as above so that the slide plate can be slid within the slide plate chamber from the second position where the second screen housing bore within the slide plate in which the second filter screen resides is aligned with flow bores in the front and back face plates to the first position where the first screen housing bore within the slide plate in which the first filter screen resides is aligned with the flow bores in the from and back face plates. The top and bottom spacer plates can then be cooled such that the top and bottom spacer plates contract to decrease space within the slide plate chamber to tightly old the slide plate between the front and back face prates preventing movement of the slide plate within the slide plate chamber. When the slide plate assembly is moved to the first position with the first screen housing bore within the slide plate aligned with the flow bores in the front and back face plates, the second screen housing bore of the slide plate can reside outside the front and back e plate to permit access to the second filter screen within the second screen housing bore, Thereby, the second filter screen can be removed from the second screen housing bore of the slide plate and a clean filter screen can be placed in the second screen housing bore of the slide plate.

Further in the method, as described above, the heating elements can be heated that are stored within screw heating element chambers within sets of top screws and bottom screws that secure the front face plate and the back face plate and the top spacer plate and the bottom spacer plate together to facilitate the expansion of the top spacer plate and the bottom spacer plate to create enough space within the slide plate chamber to permit the slide plate to be movable within the slide plate chamber. In particular, the screws can be heated to relieve torque on the screws to facilitate the expansion of the top spacer plate and the bottom spacer plate to create enough space within the slide plate chamber to permit the slide plate to be movable within the slide plate chamber.

The heating the top and bottom spacer plates can be accomplished by heating a heating element within the top spacer plate and a heating element within the bottom spacer plate. In particular, the heating elements can reside in heating element chambers in the top and bottom spacer plates. In some embodiments, the heating circulation system can engage the heating element chambers to allow heating fluids to be run through the heating element chambers to heat and regulate the temperature of the top and bottom spacer plates. The temperature of the top and bottom spacer plates can be monitored, for example, by temperature gauges. Cooling element within the top spacer plate and a cooling element within the bottom spacer plate can be used to cool the top and bottom spacer plates. For example, the top and bottom spacer plates each have a cooling element chamber therein for housing the respective cooling element. Further, the temperature of the top and bottom spacer plates can be regulated through the heating and cooling of the top and bottom spacer plates based on information provided by the monitoring of the temperature within the top and bottom spacer plates.

Similarly, the front and back face plates can be heated around the flow bores the in to regulate the temperature around the flow bores in the front and back face plates to facilitate the processing of fluid through the screen changer device. The temperature within the front and back face plates can be monitored and regulated around the flow bores therein.

These and other modifications and variations to the present subject matter may be practiced by those of ordinary skill in the art, without departing from the spirit and scope of the present subject matter, which is more particularly set forth herein above. In addition it should be understood the aspects of the various embodiments lay be interchanged both in whole or in part. Furthermore, those of ordinary skill in the art will appreciate that the foregoing description is by way of example only, and is not intended to limit the present subject matter.

What is claimed is:

1. A fluid filtration apparatus for processing fluid, the fluid filtration apparatus comprising:
   a screen changer device comprising:
      a slide plate assembly comprising:
         a hydraulic cylinder with an extension arm that is extendable and retractable; and
         a slide plate secured to an end of the extension arm, the slide plate having a first screen housing bore and a second screen housing bore for housing exchangeable screens for filtering of a fluid being processed;
      a flow bore body comprising:
         a front face plate having a front flow bore and a back face plate having a back flow bore that align with each other;
         a top spacer plate and a bottom spacer plate that are positioned between a top portion of the front and back face plates and a bottom portion of the front and back face plates to form a slide plate chamber in which the slide plate slidably resides to align one of the respective first and second screen housing bores with screens therein with the respective flow bores of the front face plate and the back face plate; and
         the top spacer plate and the bottom spacer plate each comprising a heating element chamber having a heating element therein, the heating elements when heated causes the top spacer plate and the bottom spacer plate to expand to create enough space within the slide plate chamber to permit the slide plate to be movable within the slide plate chamber and when the top spacer plate and the bottom spacer plate are cooled, the slide plate is held in place within the slide plate chamber;
      a controller in operable communication with the screen changer device that extends and retracts the extension arm of the hydraulic cylinder; and
      a housing that encloses at least a portion of the screen changer device.

2. The filtration apparatus according to claim 1, wherein the front face plate and the back face plate and the top spacer plate and the bottom spacer plate are secured together with sets of top screws and bottom screws.

3. The filtration apparatus according to claim 2, wherein the top screws and the bottom screws have screw heating element chambers for receiving heating elements.

4. The filtration apparatus according to claim 3, further comprising heating elements stored within the screw heating element chambers, the heating elements within the screw heating elements being heatable to facilitate the expansion of the top spacer plate and the bottom spacer plate to create enough space within the slide plate chamber to permit the slide plate to be movable within the slide plate chamber.

5. The filtration apparatus according to claim 3, further comprising heating elements stored within the screw heating element chambers, the heating elements within the screw heating elements being heatable to heat the screws to relieve torque on the screws to facilitate the expansion of the top spacer plate and the bottom spacer plate to create enough space within the slide plate chamber to permit the slide plate to be movable within the slide plate chamber.

6. The filtration apparatus according to claim 1, wherein the front face plate and the back face plate and top spacer plate and a bottom spacer plate are at least one of machined or milled to such tolerances that during normal operations of the filtration apparatus when one of the first and second screen housing bores is aligned with the respective front and back flow bores of the front face plate and the back face plate and polymer is flowing therethrough, the slide plate is held within the chamber so as to be not movable and provides no perceivable seams between the flow bore body and the slide plate into which molten polymer being processed can flow and no additional seal is needed between the front and back face plates and the slide plate.

7. The filtration apparatus according to claim 6, wherein the heating elements in the top and bottom spacer plates are heated to heat the top and bottom spacer plates to expand the top and bottom spacer plates to create enough space with the slide plate chamber for the hydraulic cylinder to move the slide plate within the chamber without damaging the front and back face plates or the slide plate.

8. The filtration apparatus according to claim 1, wherein the heating element chambers within the top and bottom spacer plates extend along a length of the top and bottom spacer plates transverse to the flow bore direction within the screen changer device.

9. The filtration apparatus according to claim 1, wherein each of the top and bottom spacer plates further comprises a cooling element chamber.

10. The filtration apparatus according to claim 9, wherein the cooling element chambers in the top and bottom spacer plates permit circulation of a cooling fluid to regulate the temperature of the top and bottom spacer plates.

11. The filtration apparatus according to claim 9, wherein the cooling element chambers in the top and bottom spacer plates are used to cool the top and bottom spacer plates down to an operating temperature that permits the tightening of the slide plate chamber of the flow bore body against the slide plate.

12. The filtration apparatus according to claim 1, wherein the front and back face plates comprise relief channels on interior sides of the front and back face plates.

13. A screen changer device comprising:
a slide plate assembly comprising:
a hydraulic cylinder with an extension arm that is extendable and retractable: and
a slide plate secured to an end of the extension arm, the slide plate having a first screen housing bore and a second screen housing bore for housing exchangeable screens for filtering of a fluid being processed;
a flow bore body comprising:
a front face plate having a front flow bore and a back face plate having a back flow bore that align with each other;
a top spacer plate and a bottom spacer plate that are positioned between a top portion of the front and back face plates and a bottom portion of the front and back face plates to form a slide plate chamber in which the slide plate slidably resides to align one of the respective first and second screen housing bores with screens therein with the respective flow bores of the front face plate and the back face plate; and
the top spacer plate and the bottom spacer plate each comprising a heating element chamber having a heating element therein, the heating elements when heated causes the top spacer plate and the bottom spacer plate to expand to create enough space within the slide plate chamber to permit the slide plate to be movable within the slide plate chamber and when the top spacer plate and the bottom spacer plate are cooled, the slide plate is held in place within the slide plate chamber.

14. The screen changer device according to claim 13, wherein the front face plate and the back face plate and the top spacer plate and the bottom spacer plate are secured together with sets of top screws and bottom screws.

15. The screen changer device according to claim 14, wherein the top screws and the bottom screws have screw heating element chambers for receiving heating elements.

16. The screen changer device according to claim 15, further comprising heating elements stored within the screw heating element chambers, the heating elements within the screw heating elements being heatable to facilitate the expansion of the top spacer plate and the bottom spacer plate to create enough space within the slide plate chamber to permit the slide plate to be movable within the slide plate chamber.

17. The screen changer device according to claim 15, further comprising heating elements stored within the screw heating element chambers, the heating elements within the screw heating elements being heatable to heat the screws to relieve torque on the screws to facilitate the expansion of the top spacer plate and the bottom spacer plate to create enough space within the slide plate chamber to permit the slide plate to be movable within the slide plate chamber.

18. The screen changer device according to claim 13, wherein the front face plate and the back face plate and top spacer plate and a bottom spacer plate are at least one of machined or milled to such tolerances that during normal operations of the filtration apparatus when one of the first and second screen housing bores is aligned with the respective front and back flow bores of the front face plate and the back face plate and polymer is flowing therethrough, the slide plate is held within the chamber so as to be not movable and provides no perceivable seams between the flow bore body and the slide plate into which molten polymer being processed can flow and no additional seal is needed between the front and back face plates and the slide plate.

19. The screen changer device according to claim 18, wherein the heating elements in the top and bottom spacer plates are heated to heat the top and bottom spacer plates to expand the top and bottom spacer plates to create enough space within the slide plate chamber for the hydraulic cylinder to move the slide plate within the chamber without damaging the front and back face plates or the slide plate.

20. The screen changer device according to claim 13, wherein each of the top and bottom spacer plates further comprises a cooling element chamber.

21. The screen changer device according to claim 20, wherein the cooling element chambers in the top and bottom spacer plates permit circulation of a cooling fluid to regulate the temperature of the top and bottom spacer plates.

22. The screen changer device according to claim 13, wherein the front and back face plates comprise relief channels on interior sides of the front and back face plates.

* * * * *